US012605999B2

(12) United States Patent
Windom et al.

(10) Patent No.: US 12,605,999 B2
(45) Date of Patent: Apr. 21, 2026

(54) MULTI-SPEED ELECTRIC AXLE WITH COAXIAL ARCHITECTURE

(71) Applicant: Dana Automotive Systems Group, LLC, Maumee, OH (US)

(72) Inventors: Trent Windom, Waterville, OH (US); Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/885,290

(22) Filed: Sep. 13, 2024

(65) Prior Publication Data

US 2025/0100364 A1 Mar. 27, 2025

Related U.S. Application Data

(60) Provisional application No. 63/584,713, filed on Sep. 22, 2023.

(51) Int. Cl.
| | |
|---|---|
| *B60K 17/02* | (2006.01) |
| *B60K 1/00* | (2006.01) |
| *B60K 17/16* | (2006.01) |
| *B60K 7/00* | (2006.01) |

(52) U.S. Cl.
CPC .............. *B60K 1/00* (2013.01); *B60K 17/02* (2013.01); *B60K 17/16* (2013.01); *B60K 2001/001* (2013.01); *B60K 2007/0092* (2013.01); *F16H 2200/201* (2013.01)

(58) Field of Classification Search
CPC .... B60K 1/00; B60K 2001/001; B60K 17/02; B60K 17/16; B60K 2007/0092; F16H 2200/201; F16H 2200/0021; F16H 2200/0034; F16H 2200/2005; F16H 2200/2035; F16H 48/10; B60B 35/12; B60Y 2200/91
See application file for complete search history.

(56) References Cited

U.S. PATENT DOCUMENTS

| | | | | |
|---|---|---|---|---|
| 4,077,282 | A | * | 3/1978 | Kress ...................... F16H 3/663 475/282 |
| 4,611,504 | A | * | 9/1986 | Rundle .................. B60K 17/16 74/342 |
| 2007/0093347 | A1* | | 4/2007 | Janson ................ F16D 25/0638 475/199 |
| 2015/0151634 | A1* | | 6/2015 | Smetana ................ B60K 17/16 475/150 |
| 2016/0146322 | A1* | | 5/2016 | Knoblauch .............. B60K 1/00 475/198 |
| 2018/0216713 | A1* | | 8/2018 | LaForce .............. F16H 37/0813 |
| 2018/0363755 | A1* | | 12/2018 | Wakui ..................... B60T 1/062 |

(Continued)

*Primary Examiner* — Farhana Pervin
(74) *Attorney, Agent, or Firm* — McCoy Russell LLP

(57) ABSTRACT

A system and method for a multi-speed electric axle. The multi-speed electric axle includes, in one example, an electric machine rotationally coupled to sun gear in a first planetary gear set, a second planetary gear set rotationally coupled to a carrier in the first planetary gear set, a third planetary gear set rotationally coupled to the second planetary gear set, and a differential rotationally coupled to the third planetary gear set. In the multi-speed electric axle, the electric machine, the first planetary gear set, the second planetary gear set, the third planetary gear set, and the differential are coaxially arranged.

14 Claims, 5 Drawing Sheets

(56) References Cited

U.S. PATENT DOCUMENTS

| | | | |
|---|---|---|---|
| 2019/0054818 A1* | 2/2019 | Garcia | B60K 17/16 |
| 2019/0063577 A1* | 2/2019 | Valente | F16H 57/037 |
| 2021/0394602 A1* | 12/2021 | Schilder | F16H 3/66 |
| 2022/0065330 A1* | 3/2022 | Engerman | B60K 1/00 |
| 2024/0141972 A1* | 5/2024 | Steffens | F16H 37/0833 |
| 2024/0328491 A1* | 10/2024 | Makam | F16H 3/66 |

* cited by examiner

MULTI-SPEED ELECTRIC AXLE WITH COAXIAL ARCHITECTURE

CROSS-REFERENCE TO RELATED APPLICATION

The present application claims priority to U.S. Provisional Application No. 63/584,713, entitled "MULTI-SPEED ELECTRIC AXLE WITH COAXIAL ARCHITECTURE", and filed on Sep. 22, 2023. The entire contents of the above-listed application are hereby incorporated by reference for all purposes.

TECHNICAL FIELD

The present disclosure relates to a multi-speed electric axle with a coaxial architecture for an electric machine, planetary gear sets, and a differential.

BACKGROUND AND SUMMARY

Segments of the vehicle market are moving towards electrification. Certain vehicle platforms demand off-road and on-road capabilities. Some off-road capable vehicles demand comparatively large gear reductions to achieve high torque while achieving high system efficiency. Further, some electric vehicles (EV) architectures constrain the space available for an electric axle due to the layout of other systems such as the traction battery, vehicle frame, and suspension system.

The inventors have recognized the abovementioned challenges and developed a multi-speed electric axle assembly to at least partially overcome the challenges. The multi-speed electric axle assembly includes, in one example, an electric machine rotationally coupled to sun gear in a first planetary gear set. The multi-speed electric axle assembly further includes a second planetary gear set rotationally coupled to a carrier in the first planetary gear set. The multi-speed electric axle assembly even further includes a third planetary gear set rotationally coupled to the second planetary gear set. The multi-speed electric axle assembly additionally includes a differential rotationally coupled to the third planetary gear set. In the electric axle assembly, the electric machine, the first planetary gear set, the second planetary gear set, the third planetary gear set, and the differential are coaxially arranged. In this way, the electric axle is able to achieve a compact architecture with high efficiency that may be utilized in highly spatially constrained vehicle platforms, if desired.

In one example, the multi-speed electric axle includes a clutch that is configured to selectively lock for rotation a sun gear and a carrier in the second planetary gear set in a one position. When the clutch is placed in this configuration the electric axle operates in a higher range mode. Conversely, when the clutch is placed in another position where the clutch grounds a carrier in the second planetary gear set, the electric axle operates in a lower range mode. In this way, geartrain efficiency is increased in the higher range mode while achieving desired torque capabilities in the lower range mode. To elaborate, by locking rotation of the sun gear and the carrier in the second planetary gear set, bearing and gear losses in the second planetary gear set are reduced.

Further, in one example, a sun gear in the third planetary gear set may be rotationally coupled to a ring gear in the second planetary gear set. Further, in such an example, a carrier in the third planetary gear set may be rotationally coupled to a differential. Still further, in such an example, a ring gear in the first planetary gear set and a ring gear in the third planetary gear set may be grounded. In this way, the multi-speed electric axle assembly achieves a targeted gear reduction in a space efficient package.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric axle with a coaxial architecture that achieves multi-speed functionality in a space efficient package that can operate in at least a higher range mode and a lower range mode is described herein. To achieve the aforementioned characteristics, the electric axle includes three planetary gear sets, where a clutch is configured to switch the second planetary gear set between a higher range configuration and a lower range configuration. In the higher range configuration, in one example, a sun gear and a carrier in the second planetary gear set are coupled for rotation with one another and function as the second planetary gear set's input. In the lower range configuration, the carrier in the second planetary gear set is grounded, in one example, and the sun gear functions as the second planetary gear set's input. In both the higher and lower range modes, a ring gear in the second planetary gear set may function as the gear set's output.

Figure 1:
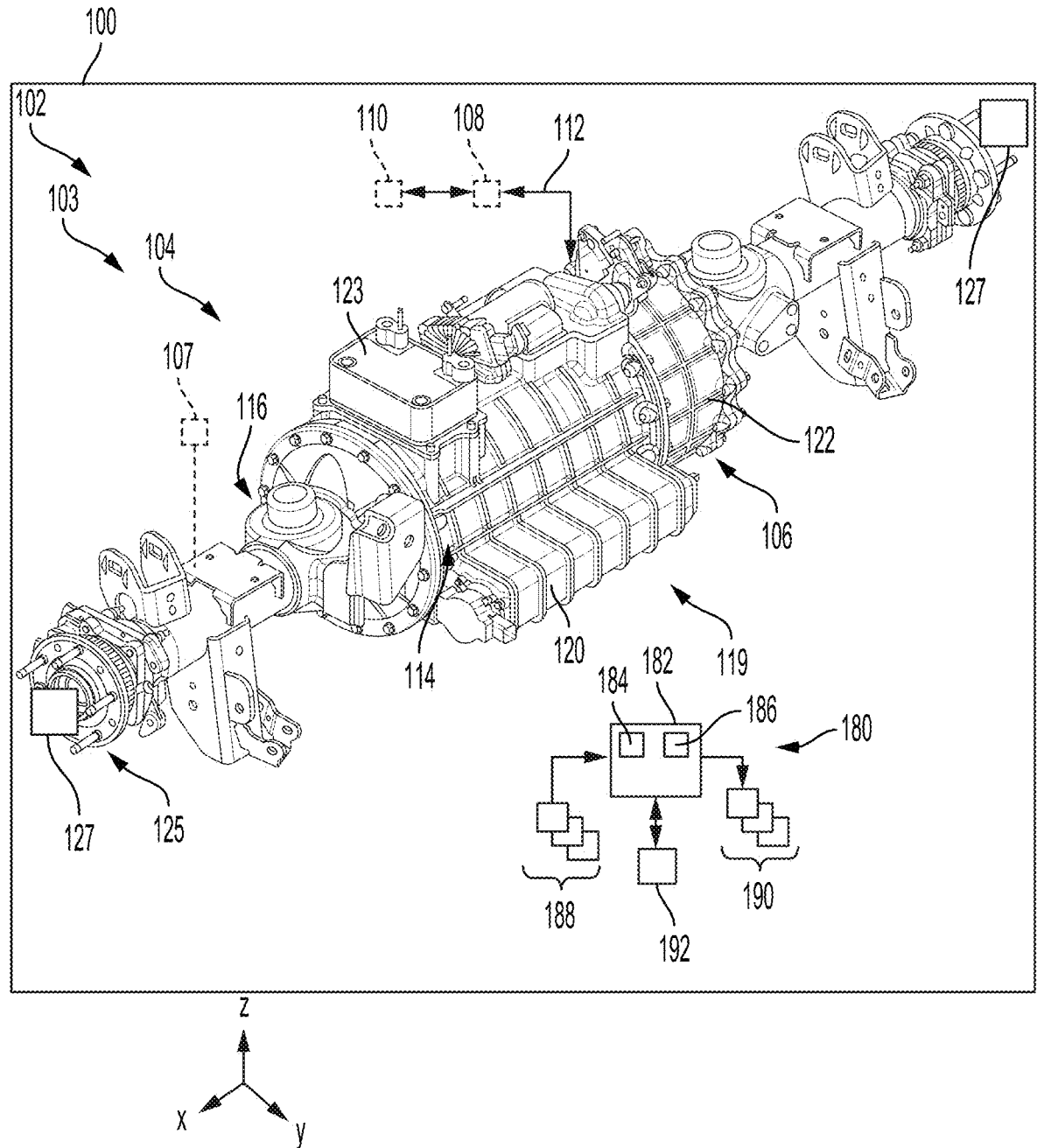
FIG. 1 shows a detailed illustration of a multi-speed electric axle in a vehicle.

FIG. 1 shows an electric vehicle (EV) 100 that includes a powertrain 102 with an electric axle assembly 103 that includes an electric axle 104 which may be formed as an assembly. The EV 100 may be a hybrid electric vehicle (HEV) in one example, or an all-electric vehicle (e.g., a battery electric vehicle (BEV)), in another example.

As described herein an electric axle is an electric drive incorporated into an axle. The electric axle may be an electric beam axle, in one example. A beam axle is an axle with mechanical components structurally supporting one another and extending between drive wheels. For instance, the beam axle may be a structurally continuous structure that spans the drive wheels on a lateral axis, in one embodiment. Thus, in the beam axle, wheels coupled to the beam axle substantially move in unison when articulating, during, for example, vehicle travel on uneven road surfaces. To elaborate, in the beam axle, the camber angle of the wheels may remain substantially constant as the suspension moves through its travel. The beam axle may be coupled to a dependent suspension system 107, in one example. Therefore, the electric axle may be an unsprung mass.

The electric axle 104 includes an electric machine 106 (e.g., a traction motor). The electric machine 106 may be an electric motor-generator, for example. For instance, the electric machine 106 may be designed as a multi-phase alternating current (AC) motor-generator. However, in other examples, the electric machine may be a motor without generator capabilities.

As illustrated in FIG. 1, the electric machine 106 may be electrically coupled to an inverter 108. The inverter 108 is designed to convert direct current (DC) electric power to alternating current (AC) electric power and vice versa. Therefore, the electric machine 106 may be an AC electric machine, as previously indicated. However, in other examples, the electric machine may be a DC electric machine and the inverter may therefore be omitted from the electric drive, in such an example. The inverter 108 may receive electric energy from one or more energy storage device(s) 110 (e.g., traction batteries, capacitors, combinations thereof, and the like). Arrows 112 signify the electric energy transfer between the electric machine 106, the inverter 108, and the energy storage device(s) 110 that may occur during different modes of electric axle operation (e.g., a drive mode and a regeneration mode). As such, during a drive mode, electric energy may flow from the energy storage device(s) 110 to the electric machine 106 and during a regenerative mode, electric energy may flow in the opposite direction from the electric machine to the energy storage device(s).

The electric axle 104 further includes a planetary gear set assembly 114 with multiple planetary gear sets and at least one clutch that is configured to shift the geartrain between at least a higher range mode and a lower range mode. The planetary gear set assembly 114 include a differential incorporated therein in the illustrated example. The electric machine 106, the planetary gear sets, and the differential are coaxially arranged to enable the axle to achieve increased compactness. Consequently, the electric axle may be incorporated into a wider variety of vehicle platforms. Specifics with regard to the planetary gear set assembly are expanded upon herein in relation to FIGS. 2-3B.

In the example illustrated in FIG. 1, the electric axle 104 further includes an axle shaft housing 116 that house axle shafts which rotationally couple the differential and drive wheels 127 via wheel hubs 125, in the illustrated example. However, other suitable component architectures may be used to couple the drive wheels and the differential, in other examples. The drive wheels 127 are schematically depicted in FIG. 1.

The planetary gear set assembly 114 includes a housing 119 with a section 120 that is removably coupled to a section 122. The section 120 may at least partially enclose a traction motor and/or one or more planetary gear sets and the section 122 may at least partially enclose a differential and one or more planetary gear sets or vice versa. The axle shaft housing 116 includes different sections that are removably coupled to the housing section 122 and the housing section 120. However, other suitable housing architectures may be used in other examples. A heat exchanger 123 is coupled to the housing section 120, in the illustrated example. However, other axle layouts are possible.

The EV 100 may also include a control system 180 with a controller 182. The controller 182 includes a processor 184 and memory 186. The memory 186 holds instructions stored therein that when executed by the processor 184 cause the controller 182 to perform the various methods, control techniques, etc., described herein. The processor 184 may include a microprocessor unit and/or other types of circuits. The memory 186 includes known data storage mediums such as random access memory, read only memory, keep alive memory, combinations thereof, and the like.

The controller 182 may receive various signals from sensors 188 positioned in different locations in the EV 100 and the electric axle 104, more specifically. The sensors may include an electric machine speed sensor, a clutch position sensor, energy storage device temperature sensor(s), an energy storage device state of charge sensor(s), wheel speed sensors, and the like. The controller 182 may also send control signals to various actuators 190 coupled at different locations in the EV 100, and the electric axle 104. For instance, the controller 182 may send signals to the inverter 108 to adjust the rotational speed of the electric machine 106. The other controllable components in the vehicle and powertrain may function in a similar manner with regard to command signals and actuator adjustment. For instance, the controller 182 may send signals to a clutch in the planetary gear set assembly 114 to engage and disengage the clutch to operate the axle in different range modes, which are expanded upon herein.

The EV 100 may also include one or more input device(s) 192 (e.g., an accelerator pedal, a brake pedal, a gear selector, a drive mode selector, a differential locker actuator, a console instrument panel, a touch interface, a touch panel, a keyboard, combinations thereof, and the like) in electronic communication with the controller 182. The input device(s) 192, responsive to operator input, may generate an acceleration adjustment request, a gear shift request, and the like.

Figure 2:
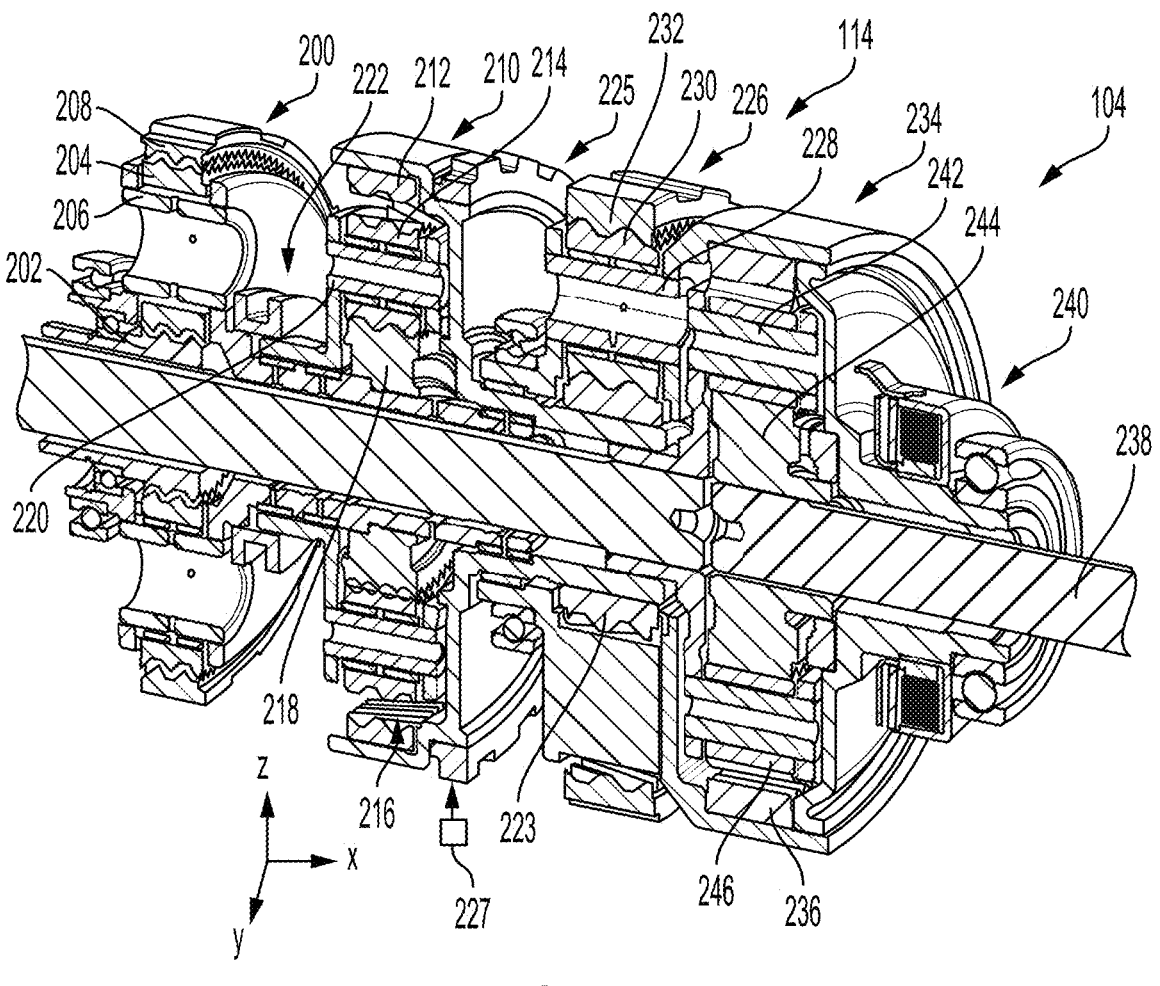
FIG. 2 shows a cross-sectional view of the electric axle depicted in FIG. 1.
Figure 3A:
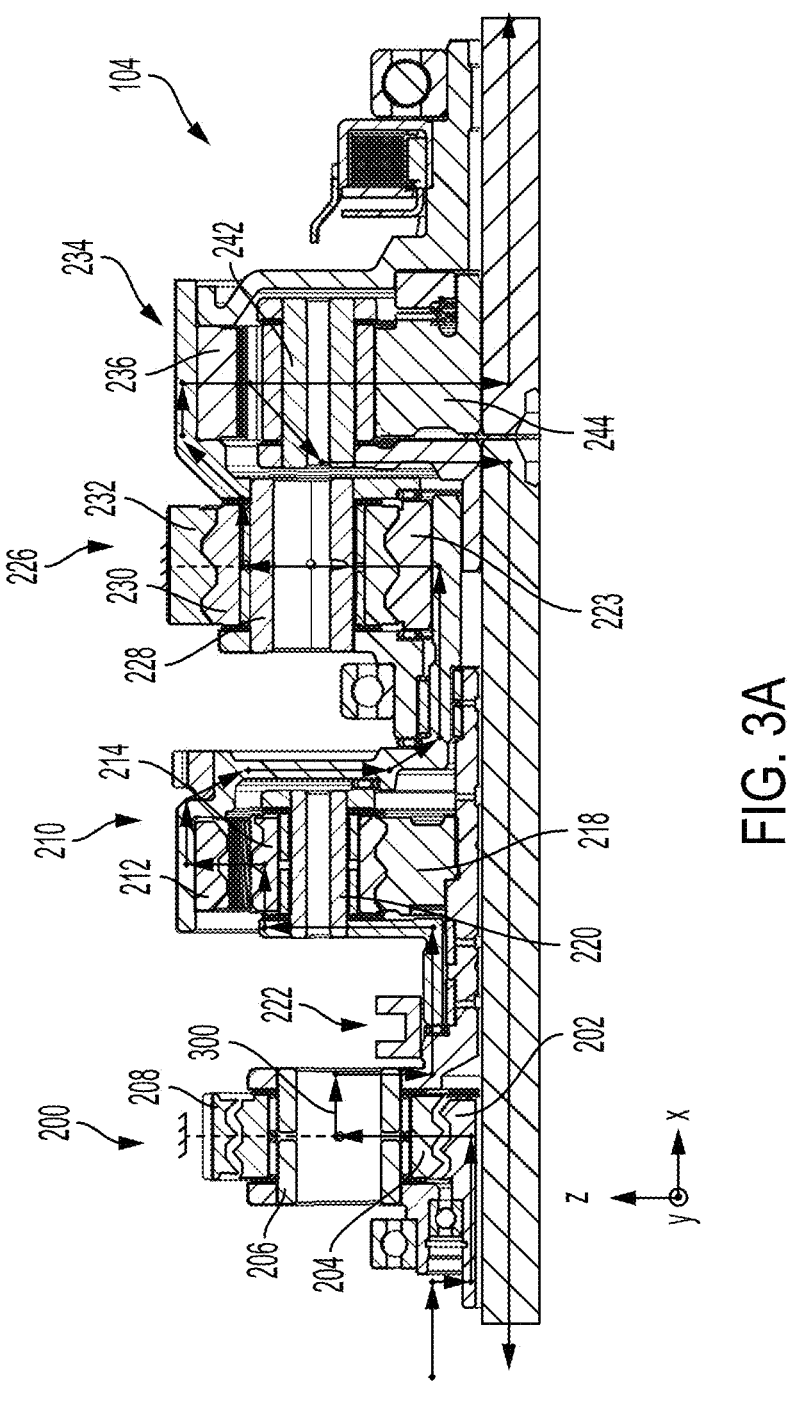
FIGS. 3A-3B show mechanical power paths through the electric axle depicted in FIG. 1 in different operating modes.
Figure 3B:
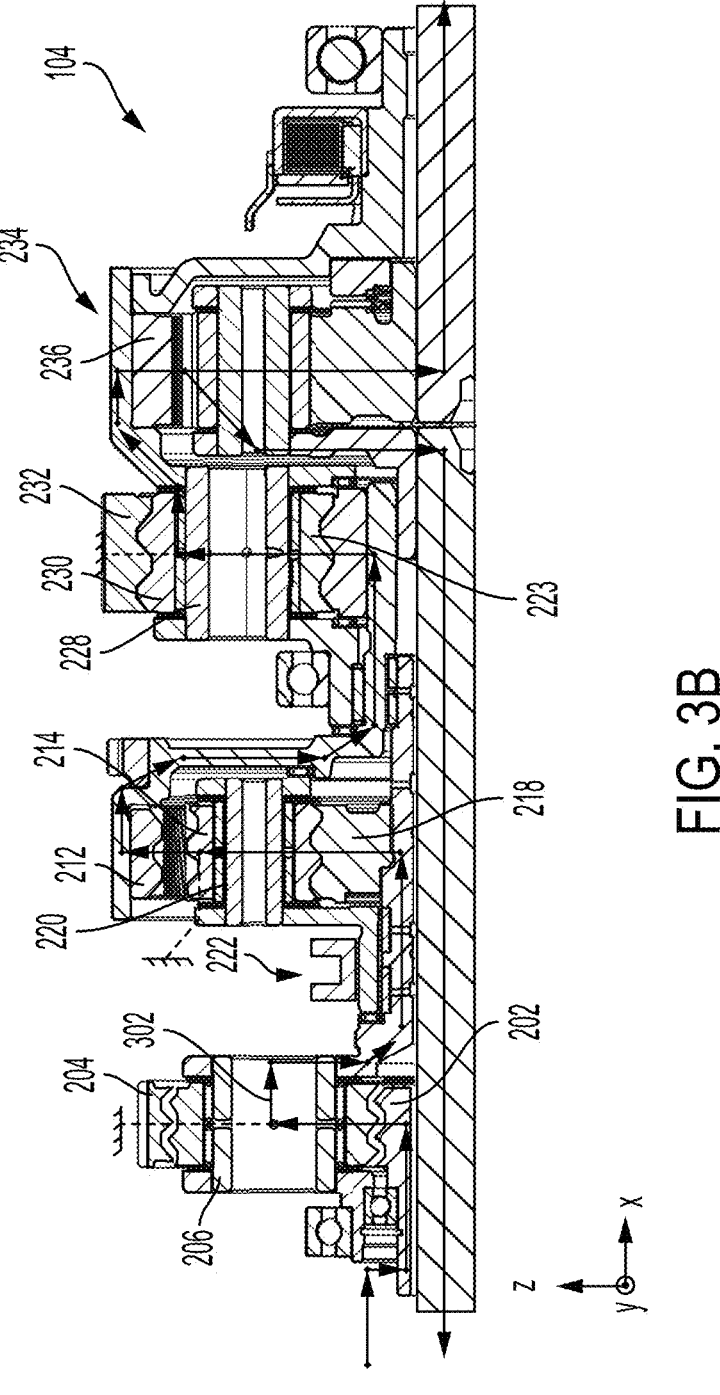
Figure 4:
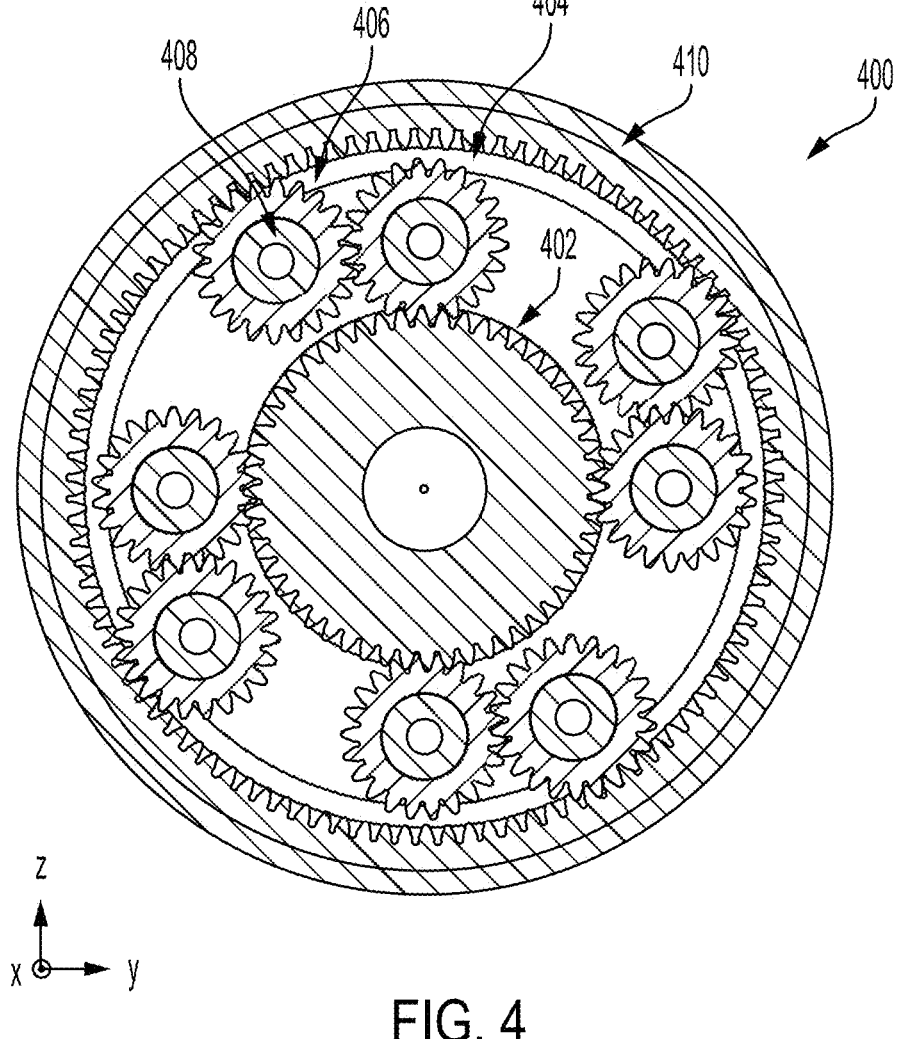
FIG. 4 shows an example of a compound planetary gear set for an electric axle.

An axis system is provided in FIG. 1 as well as FIGS. 2-4, for reference, when appropriate. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 shows a cross-sectional view of the electric axle 104 with the housing of the planetary gear set assembly 114 removed to reveal the internal gear sets and other components. A first planetary gear set 200 is depicted in FIG. 2. In the illustrated example, a sun gear 202 of the first planetary gear set 200 is rotationally coupled to a rotor shaft of the electric machine 106, shown in FIG. 1. The first planetary gear set 200 further includes planet gears 204 that rotate on a carrier 206 and mesh with a ring gear 208. The planetary gear set assembly 114 further includes a second planetary gear set 210 which includes a ring gear 212, a first set of planet gear 214, a second set of planet gears 216, a sun gear 218, and a carrier 220 on which both sets of planet gears rotate.

FIG. 4 shows an example of a compound planetary gear set assembly 400 that may be used in the electric axle 104 as the second planetary gear set. As shown in FIG. 4, the planetary gear set 400 includes a sun gear 402, a first set of planet gears 404, a second set of planet gears 406, a carrier 408 on which the sets of planet gears are mounted, and a ring gear 410. The first set of planet gears 404 mesh with the sun gear 402 and the second set of planet gears 406 mesh with the ring gear 410. Using a compound planetary gear set in the electric axle allows the input and the output of the planetary gear set to have a similar rotational direction.

Returning to FIG. 2, the carrier 206 in the first planetary gear set 200 is rotationally coupled to the sun gear 218 in the second planetary gear set 210. A clutch 222 (e.g., a dog clutch) is further included in the planetary gear set assembly 114. The clutch 222 is configured to rotationally couple the carrier 220 and the sun gear 218 such that the carrier 220 and the sun gear 218 (functioning as the compound planetary gear set's input) are locked together such that they rotate in unison in a first position (e.g., a higher range position) to operate the electric axle into a higher range mode. It will be appreciated that the ring gear 212 functions as the output of the planetary gear set 210. Additionally, the clutch 222 is configured to ground the carrier 220 in a second position (e.g., a lower range position) to operate the electric axle in a lower range mode. However, it will be appreciated that in other embodiments a first clutch may be configured to lock the sun gear 218 to the carrier 220 and a second clutch may be configured to ground the carrier 220.

As discussed above, grounding the carrier 220 via the clutch 222 allows the electric axle to operate in a lower range mode and locking the sun gear 218 to the carrier 220 allows the electric axle to operate in a higher range mode. In the higher range mode, the second planetary gear set 210 achieves a 1:1 ratio, in one specific example. When the electric axle is operated in the higher range mode, bearing and windage losses in the second planetary gear set 210 are reduced (e.g., avoided), thereby increasing electric axle efficiency and longevity.

The use of a compound planetary gear set with a first set of planet gears and a second set of planet gears allows the second planetary gear set 210 to maintain a similar rotational direction with regard to the input and output of the planetary gear set. However, the second planetary gear set may have another suitable layout, in other embodiments.

A park gear 225 may be coupled to the ring gear 212. A park lock device 227, schematically depicted in FIG. 2, may be configured to engage the park gear 225.

The carrier 206 is rotationally coupled to the sun gear 218 in the illustrated example. Further, the ring gear 212 is rotationally coupled to a sun gear 223 of a third planetary gear set 226, in the illustrated example. The third planetary gear set 226 further includes a carrier 228, planet gears 230 that rotate on the carrier, and a ring gear 232.

In the illustrated example, the carrier 228 is rotationally coupled to a planetary differential 234 (e.g., a ring gear 236 of the planetary differential 234). The planetary differential 234 is rotationally coupled to axle shafts 238. The planetary differential 234 may further include a locking device 240 that is configured to inhibit speed differentiation between the axle shafts. A carrier 242 of the planetary differential may be rotationally coupled to one of the axle shafts and a sun gear 244 may be rotationally coupled to the other axle shaft. The planetary differential 234 further includes planet gears 246 that rotate on the carrier 242. The differential may be another suitable type of differential in other embodiments such as an open differential, a limited slip differential, and the like.

The first and third planetary gear sets 200 and 226 are simple planetary gear sets in the illustrated example. Further, the second planetary gear set 210 is a compound planetary gear set in the illustrated example. In this way, axle compactness may be increased while achieving the same rotational direction of the input and output of the second planetary gear set.

FIG. 3A shows a mechanical power path 300 in the electric axle 104 in the higher range mode. In both the higher and lower range modes, the ring gear 212 and the ring gear 232 are grounded. Further, in the higher range mode, the clutch 222 locks the sun gear 218 to the carrier 220. As shown, power travels to the sun gear 202 from the electric motor, from the sun gear 202 to the carrier 206 via the planet gears 204, from the carrier 206 to the sun gear 218 and the carrier 220 via the clutch 222, from the carrier 220 to the ring gear 212 via the first set of planet gears 214 and the second set of planet gears 216 (shown in FIG. 2), from the ring gear 212 to the sun gear 223, from the sun gear 223 to the carrier 228 via the planet gears 230, and from the carrier 228 to the planetary differential 234 via the ring gear 236. In the planetary differential 234 torque is split between the carrier 242 and the sun gear 244 when the differential is unlocked.

FIG. 3B shows a mechanical power path 302 in the electric axle 104 in the lower range mode. In the lower range mode, the clutch 222 grounds the carrier 220. As shown, power travels to the sun gear 202 from the electric motor, from the sun gear 202 to the carrier 206 via the planet gears 204, from the carrier 206 to the sun gear 218 via the clutch 222, from the sun gear 218 to the ring gear 212 via the first set of planet gears 214 and the second set of planet gears 216 (shown in FIG. 2), from the ring gear 212 to the sun gear 223, from the sun gear 223 to the carrier 228 via the planet gears 230, and from the carrier 228 to the planetary differential 234 via the ring gear 236. In the planetary differential 234 torque is split between the carrier 242 and the sun gear 244 when the differential is unlocked.

The electric axles described herein achieve two-speed functionality in a compact package. In the lower range mode (e.g., first gear mode) the electric axle may be used for high torque off road maneuvers, for instance. Conversely, in the higher range mode (e.g., the second gear mode) the vehicle may be operated at higher speed in on-road environments, for instance. The planetary gear set assembly achieves a high efficiency in the higher range mode due to the bearing and meshing losses in the second planetary gear set being reduced, thereby increasing vehicle range.

The multi-speed electric axles described herein exhibit a coaxial arrangement with regard to the electric machine, the planetary gear sets, and the differential. This coaxial electric axle layout allows the axle to be packaged in highly constrained vehicle platforms, if desired. Further, the coaxial electric axle architecture allows the excess overhung mass to be reduced or prevented, in one specific example. Further, the coaxial electric axles described herein achieve high efficiency in a higher range mode of operation which may be used in on-road environments. Further, the electric axles described herein achieve an efficiency of a two stage reduction in the higher range mode while maintaining a torque capability for a three stage reduction in a lower range mode.

FIGS. 2-4 are drawn approximately to scale, aside from the schematically depicted components. However, the components may have alternate relative dimensions, in other embodiments.

FIGS. 1-4 show example configurations with relative positioning of the various components. However, it will be appreciated that if shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Still further in some examples, elements positioned coaxial or parallel to one another may be referred to as such.

The invention will be further described in the following paragraphs. In one aspect, a multi-speed electric axle assembly is provided that comprises an electric machine rotationally coupled to sun gear in a first planetary gear set; a second planetary gear set rotationally coupled to a carrier in the first planetary gear set; a third planetary gear set rotationally coupled to the second planetary gear set; and a differential rotationally coupled to the third planetary gear set; wherein the electric machine, the first planetary gear set, the second planetary gear set, the third planetary gear set, and the differential are coaxially arranged. In one example, the multi-speed electric axle assembly may further comprise a clutch configured to selectively lock for rotation a sun gear and a carrier in the second planetary gear set in a higher range position. In one example, the multi-speed electric axle assembly may further comprise a clutch configured to ground the carrier in the second planetary gear set in a lower range position. In another example, a sun gear in the third planetary gear set may be rotationally coupled to a ring gear in the second planetary gear set. In another example, a carrier in the third planetary gear set may be rotationally coupled to a differential. In another example, a ring gear in the first planetary gear set and a ring gear in the third planetary gear set may be grounded. In another example, the clutch may be a dog clutch. In another example, the first planetary gear set and the third planetary gear set may be simple planetary gear sets. In yet another example, the second planetary gear set may be a compound planetary gear set. In yet another example, the multi-speed electric axle assembly may be an electric beam axle. In another example, the differential may be a planetary differential with a first axle shaft coupled to a sun gear in the planetary differential and a second axle shaft rotationally coupled to a carrier in the planetary differential.

In another aspect, a multi-speed electric beam axle is provided that comprises a traction motor rotationally coupled to sun gear in a first planetary gear set; a second planetary gear set rotationally coupled to a carrier in the first planetary gear set; a third planetary gear set rotationally coupled to the second planetary gear set; a differential rotationally coupled to the third planetary gear set; and a clutch configured to shift the second planetary gear set between a lower range mode and a higher range mode; wherein the traction motor, the first planetary gear set, the second planetary gear set, the third planetary gear set, and the differential are coaxially arranged. In one example, the clutch may be configured to: in the higher range mode, lock for rotation a sun gear and a carrier in the second planetary gear set in a higher range position; and in the lower range mode, ground the carrier in the second planetary gear set in a lower range position. In another example, the second planetary gear set may be a compound planetary gear set. In yet another example, the first planetary gear set and the third planetary gear set may be simple planetary gear sets. In yet another example, a ring gear in the first planetary gear set and a ring gear in the third planetary gear set may be grounded. In another example, a carrier in the third planetary gear set may be rotationally coupled to a differential. In another example, a sun gear in the third planetary gear set may be rotationally coupled to a ring gear in the second planetary gear set. In another example, the differential may be a planetary differential with a first axle shaft coupled to a sun gear in the planetary differential and a second axle shaft rotationally coupled to a carrier in the planetary differential. In yet another example, the multi-speed electric beam axle may be included in an all-electric vehicle.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A multi-speed electric axle assembly comprising:
an electric machine rotationally coupled to a sun gear in a first simple planetary gear set;

a compound planetary gear set rotationally coupled to a carrier in the first simple planetary gear set;

a second simple planetary gear set including a sun gear that is rotationally coupled to a ring gear in the compound planetary gear set;

a differential rotationally coupled to the second simple planetary gear set; and a clutch configured to:

selectively lock for rotation a sun gear and a carrier in the compound planetary gear set in a higher range position of a higher range mode, wherein in the higher range mode the sun gear and the carrier in the compound planetary gear set rotate; and ground the carrier in the compound planetary gear set in a lower range position of a lower range mode, wherein in the lower range mode the multi-speed electric axle assembly achieves a three stage gear reduction;

wherein an input and an output of the compound planetary gear set have a similar rotational direction;

wherein the electric machine, the first simple planetary gear set, the compound planetary gear set, the second simple planetary gear set, and the differential are coaxially arranged;

wherein the compound planetary gear set includes:

a first set of planet gears that mesh with a sun gear and does not mesh with a ring gear; and a second set of planet gears that mesh with the ring gear and does not mesh with the sun gear; and wherein the differential is a planetary differential with a ring gear that is coupled to a carrier in the second simple planetary gear set.

2. The multi-speed electric axle assembly of claim 1, further comprising:

a park gear coupled to the ring gear in the compound planetary gear set; and a park lock device configured to engage the park gear.

3. The multi-speed electric axle assembly of claim 2, wherein a sun gear in the second simple planetary gear set is rotationally coupled to a ring gear in the compound planetary gear set.

4. The multi-speed electric axle assembly of claim 2, wherein a ring gear in the first simple planetary gear set and a ring gear in the second simple planetary gear set are grounded.

5. The multi-speed electric axle assembly of claim 2, wherein the clutch is a dog clutch.

6. The multi-speed electric axle assembly of claim 1, wherein in the higher range mode the compound planetary gear set achieve a 1:1 ratio.

7. The multi-speed electric axle assembly of claim 1, wherein the multi-speed electric axle assembly is a beam axle.

8. A multi-speed electric beam axle, comprising:

a traction motor rotationally coupled to a sun gear in a first simple planetary gear set;

a compound planetary gear set rotationally coupled to a carrier in the first planetary gear set;

a second simple planetary gear set including a sun gear that is rotationally coupled to a ring gear in the compound planetary gear set;

a differential rotationally coupled to the second simple planetary gear set; and a clutch configured to:

selectively lock for rotation a sun gear and a carrier in the compound planetary gear set in a higher range position of a higher range mode, wherein in the higher range mode the sun gear and the carrier in the compound planetary gear set rotate; and ground the carrier in the compound planetary gear set in a lower range position of a lower range mode, wherein in the lower range mode the multi-speed electric axle assembly achieves a three stage gear reduction;

wherein an input and an output of the compound planetary gear set have a similar rotational direction;

wherein the traction motor, the first simple planetary gear set, the compound planetary gear set, the second simple planetary gear set, and the differential are coaxially arranged;

wherein the compound planetary gear set includes:

a first set of planet gears that mesh with a sun gear and does not mesh with a ring gear; and a second set of planet gears that mesh with the ring gear and does not mesh with the sun gear; and wherein the differential is a planetary differential with a ring gear that is coupled to a carrier in the second simple planetary gear set.

9. The multi-speed electric beam axle of claim 8, wherein the clutch is configured to:

in the higher range mode, lock for rotation a sun gear and a carrier in the compound planetary gear set in a higher range position; and in the lower range mode, ground the carrier in the compound planetary gear set in a lower range position.

10. The multi-speed electric beam axle of claim 8, further comprising:

a park gear coupled to the ring gear in the compound planetary gear set; and a park lock device configured to engage the park gear.

11. The multi-speed electric beam axle of claim 10, wherein in the higher range mode the compound planetary gear set achieve a 1:1 ratio.

12. The multi-speed electric beam axle of claim 8, wherein a ring gear in the first simple planetary gear set and a ring gear in the second simple planetary gear set are grounded.

13. The multi-speed electric beam axle of claim 8, wherein a sun gear in the second simple planetary gear set is rotationally coupled to a ring gear in the compound planetary gear set.

14. The multi-speed electric beam axle of claim 8, wherein the multi-speed electric beam axle is included in an all-electric vehicle.

\* \* \* \* \*